US012231642B2

(12) United States Patent
Sze et al.

(10) Patent No.: US 12,231,642 B2
(45) Date of Patent: Feb. 18, 2025

(54) METHOD AND APPARATUS FOR DIAGONAL SCAN AND SIMPLIFIED CONTEXT SELECTION FOR PARALLEL ENTROPY CODING OF SIGNIFICANCE MAP OF TRANSFORM COEFFICIENTS

(71) Applicant: TEXAS INSTRUMENTS INCORPORATED, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1649 days.

(21) Appl. No.: 15/431,474

(22) Filed: Feb. 13, 2017

(65) Prior Publication Data

US 2017/0171546 A1     Jun. 15, 2017

Related U.S. Application Data

(63) Continuation of application No. 14/874,100, filed on Oct. 2, 2015, now Pat. No. 9,571,860, which is a
(Continued)

(51) Int. Cl.
*H04N 19/13*     (2014.01)
*H04N 19/129*    (2014.01)
(Continued)

(52) U.S. Cl.
CPC .......... *H04N 19/129* (2014.11); *H04N 19/13* (2014.11); *H04N 19/18* (2014.11); *H04N 19/43* (2014.11); *H04N 19/60* (2014.11); *H04N 19/61* (2014.11)

(58) Field of Classification Search
CPC ...... H04N 19/61; H04N 19/129; H04N 19/13; H04N 19/18; H04N 19/60
See application file for complete search history.

(56) References Cited

U.S. PATENT DOCUMENTS 7,542,620 B1 * 6/2009 Bilbrey ................ G09G 3/2044
382/264
2008/0046698 A1 2/2008 Ahuja et al.
(Continued)

OTHER PUBLICATIONS

Vivienne Sze et al. "Parallelization of HHI Transform Coding" Oct. 2010, Guangzhou, China.
(Continued)

*Primary Examiner* — Dave Czekaj
*Assistant Examiner* — Berteau Joisil
(74) *Attorney, Agent, or Firm* — Carl G. Peterson; Frank D. Cimino

(57) ABSTRACT

A method and apparatus for encoding bit code utilizing context dependency simplification to reduce dependent scans. The method includes retrieving at least one 2 dimensional array of transform coefficient, transforming the at least one 2 dimensional array of transform coefficient to a 1 dimensional coefficient scanning using a diagonal scan in a fixed direction, utilizing the at least one 1 dimensional array of transform coefficients for context selection based on fewer than 11 neighbors, potentially selected based on scan direction, slice type, coding unit type and binarization, and performing arithmetic coding to generate coded bit utilizing context selection and binarization.

21 Claims, 5 Drawing Sheets

Related U.S. Application Data continuation of application No. 13/250,689, filed on Sep. 30, 2011, now Pat. No. 9,154,801.

(60) Provisional application No. 61/454,679, filed on Mar. 21, 2011, provisional application No. 61/430,721, filed on Jan. 7, 2011, provisional application No. 61/391,907, filed on Oct. 11, 2010, provisional application No. 61/390,083, filed on Oct. 5, 2010, provisional application No. 61/388,512, filed on Sep. 30, 2010.

(51) Int. Cl.
*H04N 19/18* (2014.01)
*H04N 19/43* (2014.01)
*H04N 19/60* (2014.01)
*H04N 19/61* (2014.01)

(56) References Cited

U.S. PATENT DOCUMENTS

| | | | |
|---|---|---|---|
| 2008/0310512 A1* | 12/2008 | Ye | H04N 19/197 375/240.16 |
| 2009/0201995 A1* | 8/2009 | Schwarz | H03M 7/4006 375/240.18 |
| 2009/0232204 A1* | 9/2009 | Lee | H04N 19/176 375/240.02 |

OTHER PUBLICATIONS

Vivienne Sze et al. "CE11: Parallelization of HHI Transform Coding (Fixed Diagonal Scan from C227)" Jul. 2011, Torino, Italy.

\* cited by examiner

METHOD AND APPARATUS FOR DIAGONAL SCAN AND SIMPLIFIED CONTEXT SELECTION FOR PARALLEL ENTROPY CODING OF SIGNIFICANCE MAP OF TRANSFORM COEFFICIENTS

CROSS-REFERENCE TO RELATED APPLICATIONS

This application is a continuation of Ser. No. 14/874,100, filed Oct. 2, 2015, which is a continuation of application Ser. No. 13/250,689, filed Sep. 30, 2011 (now U.S. Pat. No. 9,154,801), which claims benefit of application Ser. No. 61/388,512, filed Sep. 30, 2010, application Ser. No. 61/390,083, filed Oct. 5, 2010, application Ser. No. 61/391,907, filed Oct. 11, 2010, application Ser. No. 61/430,721, filed Jan. 7, 2011, and application Ser. No. 61/454,679, filed Mar. 21, 2011, which are herein incorporated by reference.

BACKGROUND OF THE INVENTION

Field of the Invention

Embodiments of the present invention generally relate to a method and apparatus for diagonal scan in a fixed direction and simplified context selection for parallel entropy coding of significance map of transform coefficients.

Description of the Related Art

In video coding standards, context modeling is a popular approach used in entropy coding to improve coding efficiency. Context modeling involves selecting a context which determines the probability used to encode binary symbols. The context selection is difficult to parallelize. It is particularly difficult at the decoder when there are too many factors that impact the selection, such as, values of other binary symbols affecting the context selection. However, such dependencies tend to provide better coding efficiency. Parallel processing is important for high performance, for example, for processing throughput, and for reducing power consumption, such as, reducing the frequency requirement or operational voltage.

Therefore, there is a need to improve parallel processing capabilities during entropy coding of transform information, while simultaneously maintaining high coding efficiency.

SUMMARY OF THE INVENTION

Embodiments of the present invention relate to a method and apparatus for a method and apparatus for encoding bit code utilizing context dependency simplification to reduce dependent scans. The method includes retrieving at least one 2 dimensional array of transform coefficient, transforming the at least one 2 dimensional array of transform coefficient to a 1 dimensional coefficient scanning using a diagonal scan in a fixed direction, utilizing the at least one 1 dimensional array of transform coefficients for context selection based on fewer than 11 neighbors, potentially selected based on scan direction, slice type, coding unit type and binarization, and performing arithmetic coding to generate coded bit utilizing context selection and binarization.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

This disclosure focuses on diagonal scanning of significance map of the transform coefficients and reducing neighbor dependency during context selection. This disclosure utilizes the binary symbols that represent the significance map of the transform. The significance map indicates the location of the non-zero transform coefficients. For improved coding efficiency, the context selection can depend on the value of the coefficients in neighboring positions in the transform, typically in the left, top-left and top directions.

In one embodiment, the transform coefficients and its significance map, indicating the locations of the non-zero coefficients, are encoded/decoded and are provided in 2 dimensional format from the transform module. In addition, the position of non-zero coefficients maybe transmitted in terms of significance map, for example, utilizing syntax elements: significant_coeff_flag, last_significant_coeff_x, last_significant_coeff_y, etc. Furthermore, coefficients values maybe transmitted, for example, utilizing syntax elements: coeff_abs_level_greater1_flag, coeff_abs_level_greater2_flag, coeff_abs_level_minus3, coeff_sign_flag, etc.

Figures 1, 2:
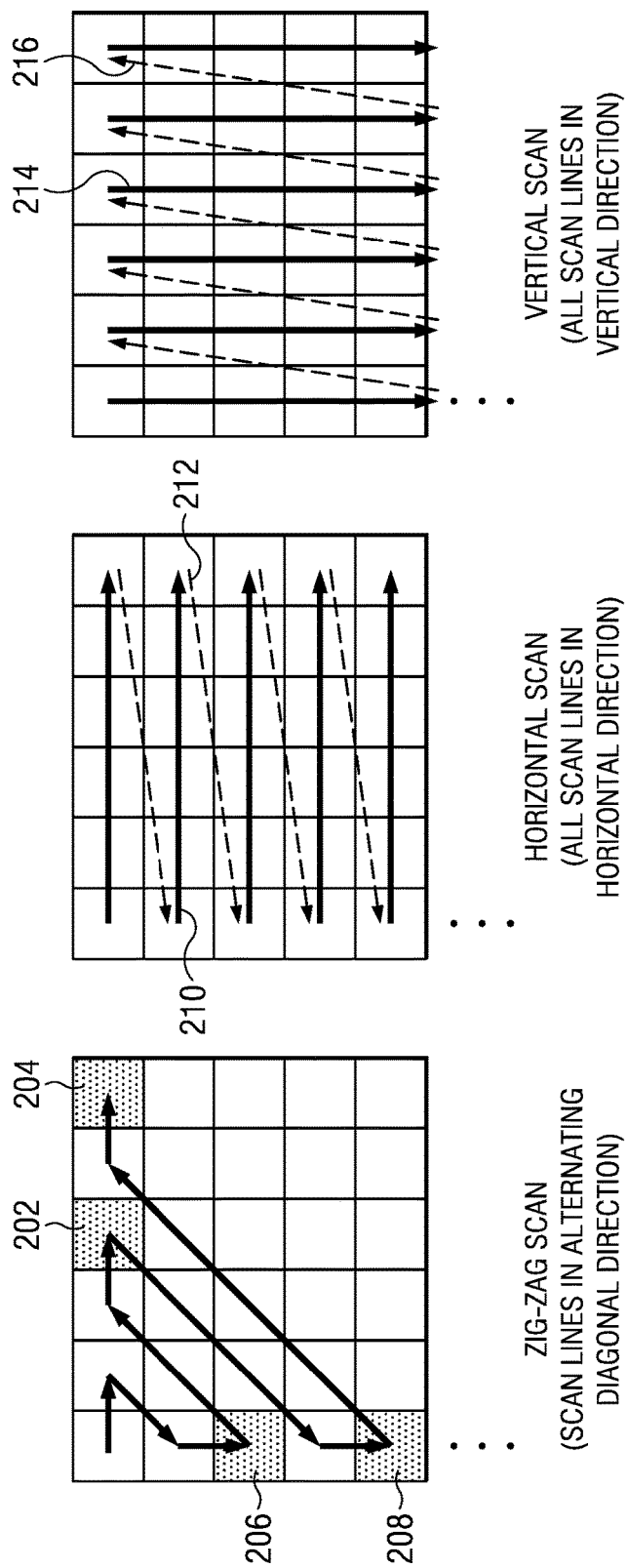
FIG. 1 is an embodiment of prior art context selection.
FIG. 2 is an embodiment of prior art scan order in zig-zag to map 2 dimension array of transform coefficients to 1 dimension array of transform coefficients.

FIG. 1 is an embodiment of prior art context selection for the significance map. In FIG. 1, the context for the significant coefficient flag for position X can depend on 11 neighboring positions (A, B, C, D, E, F, G, H, I, J and K). In one embodiment, only one of the G or K will be required, depending on the direction of the scan. With such dependency, it is difficult to select the context to decode multiple bins of different positions at the same time. This is especially difficult when the traditional approach of zig-zag scan is used, as shown in FIG. 2.

FIG. 2 is an embodiment of dependencies of context selection for map for coding efficiency with traditional zig-zag orders. If zig-zag scan is used, as shown in FIG. 2, for positions at the edge of the transform, highlighted in grey, the context selection will depend on previously decoded position which makes parallel processing difficult. FIG. 2 is an embodiment of prior art scan order to map 2 dimension array of transform coefficients to 1 dimension array of significance map of the transform coefficients; scan directions include zig-zag scan, horizontal scan and vertical scan; for zig-zag, scan the direction of the scan line changes at the edge of the 2 dimension array.

For zig-zag scan, the direction of the scan line changes at the edge of the 2 dimension array. If zig-zag scan is used, as shown in FIG. 2, for positions at the edge of the transform, highlighted in blue, the context selection will depend on previously decoded position which makes parallel processing difficult. FIG. 2 also shows the other scan directions used include vertical and horizontal scans. The solid line show the scan line and direction; while the dotted line shows how when the scan line reaches the edge of the 2 dimension array, the next position is the beginning of the next scan line usually at the opposite edge (for vertical scan, when the bottom edge is reached by the scan line, the next position is the top edge of the next scan line; for horizontal scan, when the right edge is reached by the scan line, the next position is the left edge of the next scan line).

Figure 3:
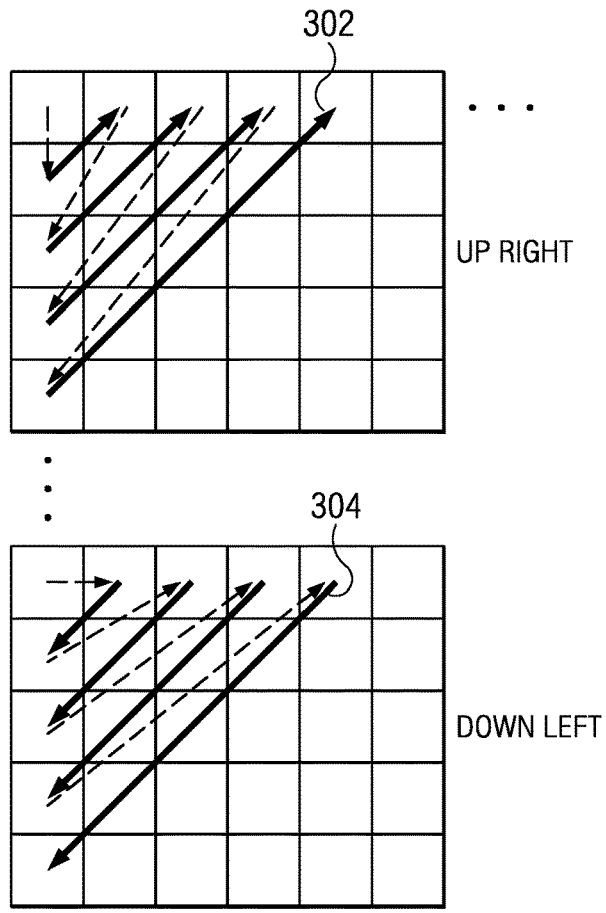
FIG. 3 is an embodiment of scan order in diagonal scan in fixed direction to map 2 dimension array of transform coefficients to 1 dimension array of transform coefficients.

FIG. 3 is an embodiment of dependencies of context selection for significant map for improved coding efficiency with different scanning orders. Rather than using the traditional zig-zag scan of FIG. 2, a diagonal scan in a fixed direction approach may be utilized. With a diagonal scan, all scan lines are processed in the same direction (either up-right or down-left) as shown in FIG. 3. The solid line show the scan line and direction; while the dotted line shows how when the scan line reaches the edge of the 2 dimension array, the next position is the beginning of the next scan line usually at the opposite edge (for up-right scan, when the top edge is reached by the scan line, the next position is the left edge of the next scan line; for down-left scan, when the left edge is reached by the scan line, the next position is the top edge of the next scan line). Using diagonal scan in fixed direction avoids this dependency at the edges (highlighted in FIG. 2) which occur for zig-zag scan.

Using diagonal scan in fixed direction avoids this dependency at the edges, highlighted in FIG. 2, which occur for zig-zag scan. A diagonal scan in fixed direction relates to a diagonal scan where the arrow point to the same direction, i.e. from upper right to lower left, from lower left to upper right and the like. In one embodiment, all diagonal scans maybe in the same direction, all up-right or all down-left. The direction of the fixed directional scan may depend on the location of the last significant coefficient. Hence, if the position of the last significant coefficient is known, it may be used to select the scan direction. Thus, the diagonals can be processed in parallel and still satisfy the top, left, and top-left dependencies, as shown in FIG. 1.

FIG. 3 is an embodiment of scan order (diagonal scan in fixed direction) to map 2 dimension array of significance map of the transform coefficients to 1 dimension array of significance map of the transform coefficients; all scan line are processed in the same direction (either up-right or down-left); the diagonal scan in fixed direction is used to replace zig-zag scan in FIG. 2.

Figure 4:
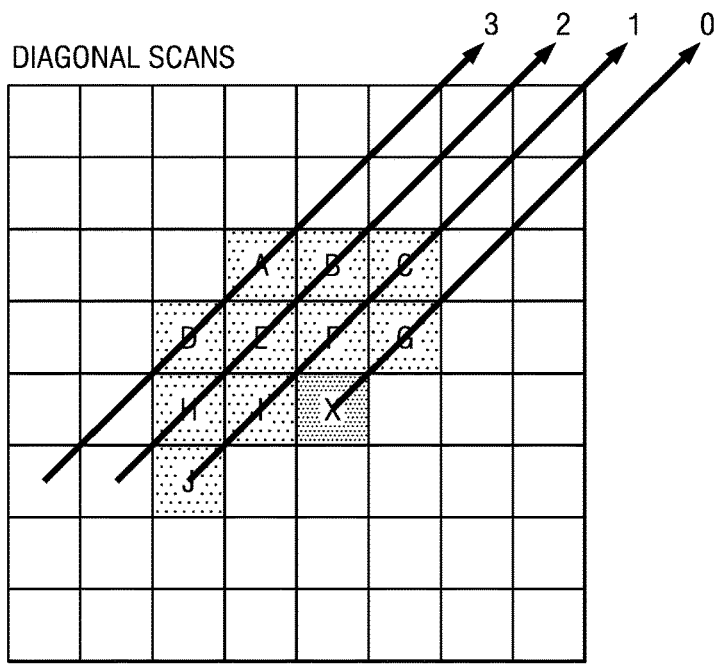
FIG. 4 shows how diagonal scan aligned with neighboring coefficient positions, whose values affect the context selection.
Figure 5:
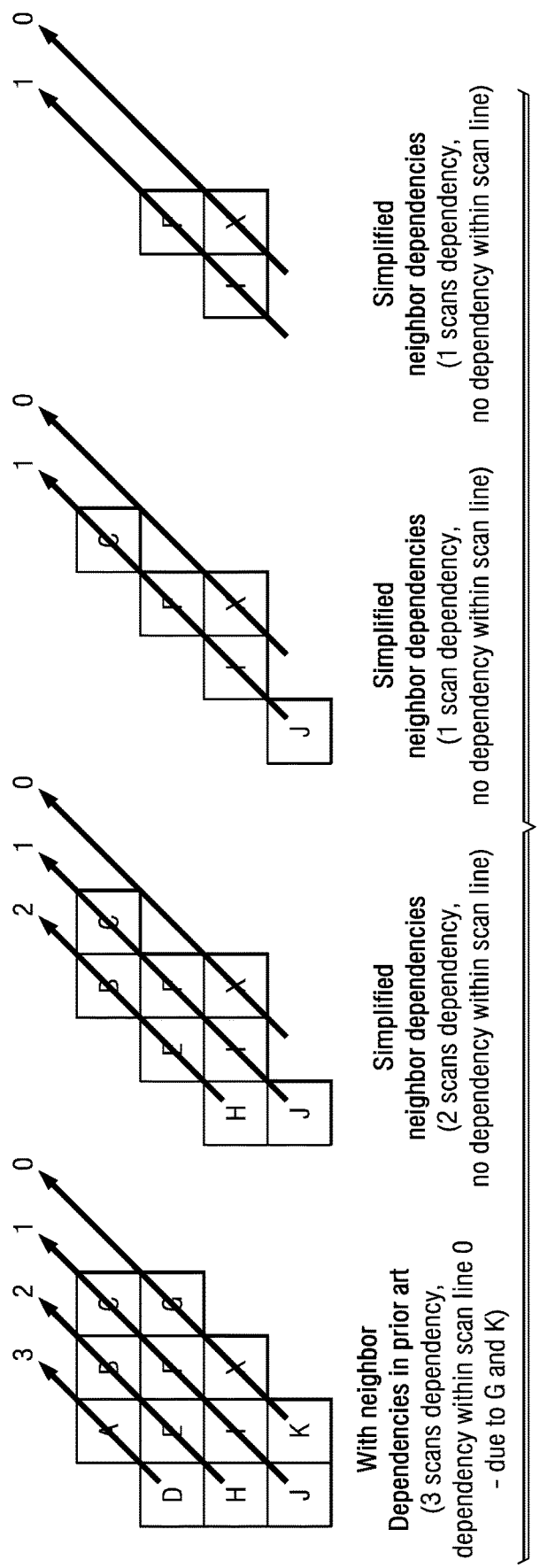
FIG. 5 is an embodiment of a context dependency simplification with no dependencies within the same scan reducing dependencies on neighbors in different scan lines.

FIG. 4 is an embodiment of dependencies of context selection for significant map for improved coding efficiency with various types of scans. In one embodiment, if while processing position X, dependencies on G and K are removed, then this eliminates dependency on previously decoded position, which is favorable for parallel processing. Furthermore, context selection for scan line 0 can begin in parallel as the scans 1, 2, and 3 are being decoded (or processed), assuming that processing of scan 1, 2, and 3 are ahead of scan line 0; removing the dependencies on neighbors in scan lines 1, 2, and 3 enables scan line 0 to be processed sooner. FIG. 5 is an embodiment of a context dependency simplification with such that there are no dependencies within the same scan (removing G and K), and also reducing dependencies on neighbors that are located on different scan lines;

To avoid dependencies due to context updates, a different set of context models may be used for each scan line, such as, positions on scan 0 may have different contexts than position on scan 1 and 2. Note that the diagonals of the proposed fixed direction scan may be processed in parallel.

Figure 6:
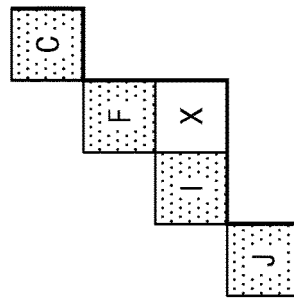
FIG. 6 is an embodiment of a context dependency simplification to reduce neighboring dependency from 11 to 4.

FIG. 6 is an embodiment of a context dependency simplification to reduce neighboring dependency to less than 11 neighbors (from 11 to 4). Simplification of context selection may also be independent of scan lines. For instance, using context selection, shown in FIG. 6, provides a good trade-off of complexity reduction and good coding gain.

Figure 8:
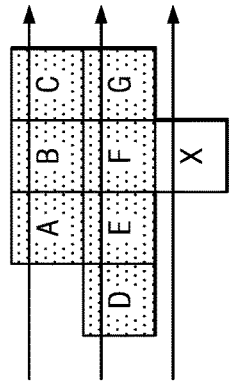
FIG. 8 is an embodiment of a context dependency simplification for horizontal scan to enable parallel processing within horizontal scan line.
Figure 7:
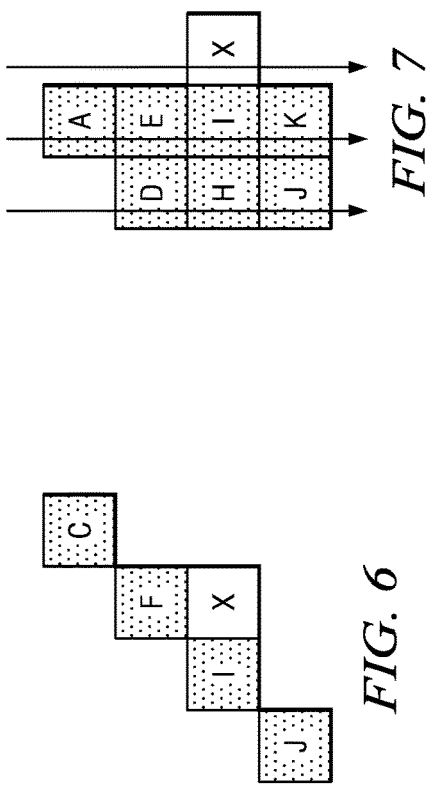
FIG. 7 is an embodiment of context dependency simplification for vertical scan to enable parallel processing within vertical scan line.

Parallelism may also be achieved within the diagonal by pre-fetching data and performing speculative computations. Eliminating G and K, for example by removing dependency on the other positions within the same scan line, reduces the amount of speculative computation and fetching. The same holds true for vertical and horizontal scans. FIG. 7 is an embodiment of context dependency simplification (removal of B,F, C, G) for vertical scan to enable parallel processing within vertical scan line; while, FIG. 8 is an embodiment of a context dependency simplification (removal of H, I, J, K) for horizontal scan to enable parallel processing within horizontal scan line. FIG. 7 shows the reduced context dependency to enable easier parallel processing within the vertical scan line. FIG. 8 shows the reduced context dependency for easier parallel processing within horizontal scan lines.

In one embodiment, the characteristics of the significance map vary with slice type or coding unit type. Coding unit type indicates whether the pixel are inter predicted via pixels from other frames and intra predicted via pixels in the same frame. The context selection dependencies can be different depending on the slice or coding unit type. For instance, P and B slices, where the residual is small, could have much simpler context selection (i.e. less dependency) than I slices which tend to have larger residuals. Thus, not only the context is being adapted, but also the context selection method based on the slice/coding unit type. In such an embodiment, some slice/coding unit type are enabled to exploit very simple context selection methods.

Therefore, an embodiment may contain any or all of the following: diagonal scanning in fixed direction for of significance map, direction of the scan can depend on the last significant coefficient position, simplified context selection to reduced dependencies while maintaining most of the coding efficiency, using different sets of context models for adjacent (or all) scans, and/or using different context selection methods depending on the slice/coding unit type. As a result, parallel decoding of various binary symbols in the significance map can occur while maintaining high coding efficiency with dependencies in context selection.

Figure 9:
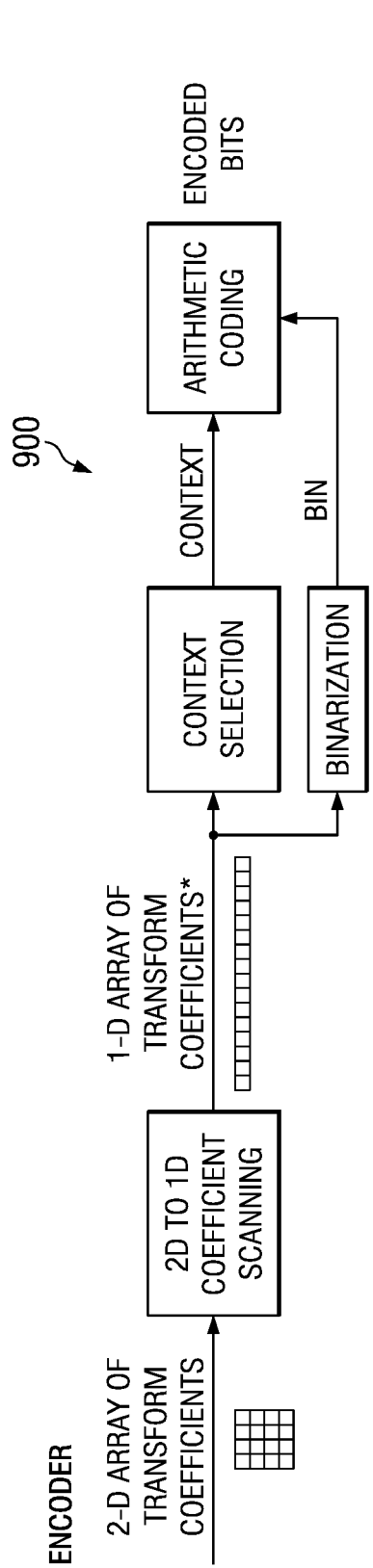
FIG. 9 is a flow diagram depicting an embodiment of a method for encoding bit code utilizing the diagonal scan in fixed direction along with context dependency simplification to reduce the dependencies to enable parallel context processing.

FIG. 9 is a flow diagram depicting an embodiment of a method 900 for encoding bit code utilizing context dependency simplification to reduce the number of dependent scans. The method 900 retrieves 2 dimensional array of transform coefficient, which is transformed to a 1 dimensional coefficient scanning. The one dimensional array of transform coefficients is then utilized for context selection and binarization, which are used for arithmetic coding to generate the coded bits.

Figure 10:
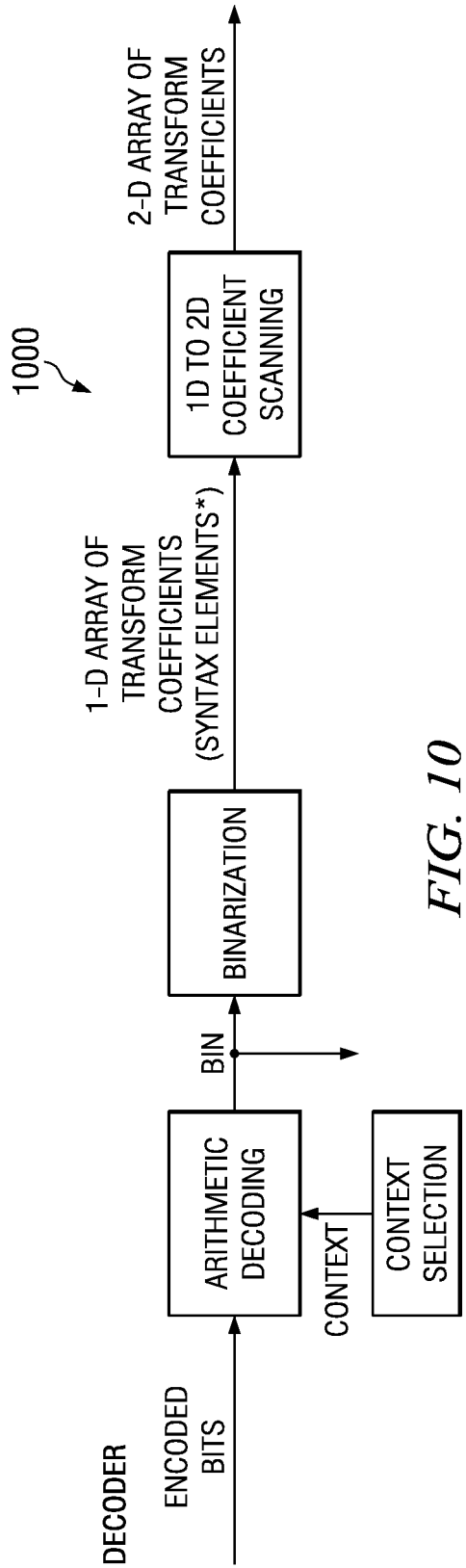
FIG. 10 is a flow diagram depicting an embodiment of a method for decoding bit code utilizing the diagonal scan in fixed direction along with context dependency simplification to reduce the number of dependencies to enable parallel context processing.

FIG. 10 is a flow diagram depicting an embodiment of a method 1000 for decoding bit code utilizing context dependency simplification to reduce the number of dependent scans. The method 1000 retrieves the encoded bits, for example, the encoded bits generated in FIG. 9, to perform arithmetic decoding. The arithmetic decoding generates binary symbols, which are utilized in binarization and in context selection. The context selection are routed back to the arithmetic decoding to generate binary symbols while maintaining high coding efficiency with dependencies in context selection. The binarization generates 1 dimensional array of transform coefficients or syntax elements, which utilized to transforming the 1 dimensional to a 2 dimensional coefficient scanning. Utilizing the two dimensional coefficient scanning generates a 2 dimensional transform coefficient.

Figure 11:
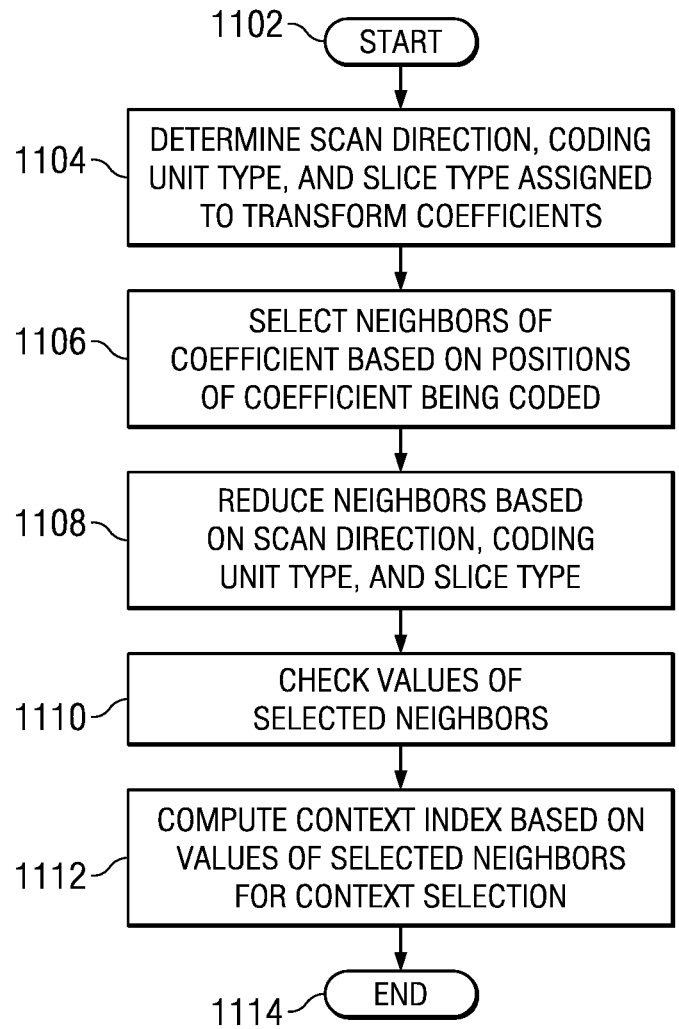
FIG. 11 is a flow diagram depicting an embodiment of a method for generating scan arrays.

FIG. 11 is a flow diagram depicting an embodiment of a method 1100 for reducing neighbor dependency in context selection. The method 1100 starts at step 1102 and proceeds to step 1104. At step 1104, the method 1100 selects one of more neighbors based on scan direction. At step 1106, the method 1100 removes neighbors from the scan. At step 1108, the method 1100 scans through selected neighbors. At step 1110, the method 1100 performs context selection. The method 1100 ends at step 1112. The steps 1104, 1106 and/or 1108 may look several times and maybe performed in various orders to improve efficiency.

While the foregoing is directed to embodiments of the present invention, other and further embodiments of the invention may be devised without departing from the basic scope thereof, and the scope thereof is determined by the claims that follow.

What is claimed is:

1. A method of encoding transform coefficients by an encoder including a digital processor, the method comprising:
   transforming, by the digital processor, a two dimensional array of transform coefficients to a one dimensional array using a series of one directional diagonal scans in a fixed direction;
   determining, by the digital processor, a context using coefficients only in diagonal rows of the two dimensional array above and left of a scan of a diagonal row including a given coefficient;
   arithmetically encoding, by the digital processor, the one dimensional array, arithmetically encoding the given coefficient using the determined context; and
   generating an encoded bit stream by at least performing the arithmetic encoding of the one dimensional array.

2. The method of claim 1, the context is determined using no more than eleven coefficients.

3. The method of claim 1, the context is determined using coefficients selected based on scan direction.

4. The method of claim 1, the context is determined based on at least one of slice type or coding unit type.

5. The method of claim 1, the context is determined by coefficients only in one diagonal row immediately above and left of a scan of the diagonal row including the given coefficient.

6. The method of claim 1, the context is determined by coefficients only in two diagonal rows immediately above and left of a scan of the diagonal row including the given coefficient.

7. A method of decoding transform coefficients by a decoder including a digital processor, the method comprising:
   receiving, at the digital processor, a bit stream including a one dimensional array of symbols representing a two dimensional array of transform coefficients scanned using a series of one directional diagonal scans in a fixed direction;
   determining, by the digital processor, a context using coefficients only in diagonal rows of the two dimensional array above and left of a scan of a diagonal row including a given coefficient;
   arithmetically decoding, by the digital processor, a given symbol in the one dimensional array of symbols using the determined context;
   debinarizing binary symbols including the decoded symbol to produce a one dimensional array of transform coefficients; and
   transforming the one dimensional array of transform coefficients to produce a two dimensional array of transform coefficients.

8. The method of claim 1, the context is determined by only two coefficients in one diagonal row immediately above and left of a scan of the diagonal row including the given coefficient.

9. The method of claim 1, the context is determined by only four coefficients in one diagonal row immediately above and left of a scan of the diagonal row including the given coefficient.

10. The method of claim 1, the context is determined by four coefficients in a first diagonal row immediately above and left of a scan of the diagonal row including the given coefficient and three coefficients in a diagonal row immediately above and left of the first diagonal row.

11. The method of claim 7, the context is determined using no more than eleven coefficients.

12. The method of claim 7, the context is determined using coefficients selected based on scan direction.

13. The method of claim 7, the context is determined based on at least one of slice type or coding unit type.

14. The method of claim 7, the context is determined by coefficients only in one diagonal row immediately above and left of a scan of the diagonal row including the given coefficient.

15. The method of claim 7, the context is determined by coefficients only in two diagonal rows immediately above and left of a scan of the diagonal row including the given coefficient.

16. The method of claim 7, the context is determined by only two coefficients in one diagonal row immediately above and left of a scan of the diagonal row including the given coefficient.

17. The method of claim 7, the context is determined by only four coefficients in one diagonal row immediately above and left of a scan of the diagonal row including the given coefficient.

18. The method of claim 7, the context is determined by four coefficients in a first diagonal row immediately above and left of a scan of the diagonal row including the given coefficient and three coefficients in a diagonal row immediately above and left of the first diagonal row.

19. The method of claim 1, further comprising transmitting the encoded bit stream.

20. The method of claim 7, further comprising presenting an image using the two dimensional array of transform coefficients via a display.

21. The method of claim 7, further comprising generating a picture using the two dimensional array of transform coefficients.

\* \* \* \* \*